United States Patent [19]

Edwards

[11] E Patent Number: Re. 32,863

[45] Reissued Date of Patent: Feb. 14, 1989

[54] LOCKING NUT ASSEMBLY FOR A GUITAR

[76] Inventor: William H. Edwards, 8892 N. 56th St., Temple Terrace, Fla. 33617

[21] Appl. No.: 173,742

[22] Filed: Mar. 25, 1988

Related U.S. Patent Documents

Reissue of:

[64] Patent No.: 4,579,033
Issued: Apr. 1, 1986
Appl. No.: 748,009
Filed: Jul. 26, 1985

U.S. Applications:

[63] Continuation-in-part of Ser. No. 544,122, Oct. 21, 1983, abandoned.

[51] Int. Cl.[4] ..... G10D 3/12
[52] U.S. Cl. ..... 84/314 N; 84/214
[58] Field of Search ..... 84/214, 267, 297 R, 84/313, 314 R, 314 N

[56] References Cited

U.S. PATENT DOCUMENTS

| | | | |
|---|---|---|---|
| D. 280,330 | 8/1985 | Tanaka | 84/298 |
| 118,353 | 8/1871 | Faas | 84/214 |
| 144,842 | 11/1973 | Ellis | 84/214 |
| 449,216 | 3/1891 | Gassett | 84/318 |
| 550,268 | 11/1895 | Hafer et al. | 84/214 |
| 582,030 | 5/1897 | Walker | 84/314 N |
| 617,915 | 1/1899 | Wells | 84/297 R |
| 907,713 | 12/1908 | Avisus . | |
| 1,331,203 | 2/1920 | Knapp | 24/134 R |
| 1,338,583 | 4/1920 | Neft | 84/314 N |
| 2,113,852 | 4/1938 | Meade . | |
| 2,241,284 | 5/1941 | Walder | 84/312 R |
| 3,093,220 | 6/1963 | Modrey | 189/36 |
| 3,191,480 | 6/1965 | Lowe | 84/318 |
| 3,429,214 | 2/1969 | Jones, Sr. | 84/314 N |
| 3,583,272 | 6/1971 | Eurich | 84/297 R |
| 3,599,524 | 8/1971 | Jones | 84/312 R |
| 3,693,490 | 9/1972 | Raphael | 84/202 |
| 3,695,130 | 10/1972 | Eurich | 84/312 R |
| 3,695,137 | 10/1972 | Eurich | 84/312 R |
| 3,739,680 | 6/1973 | Christiansen | 84/266 |
| 4,078,468 | 3/1978 | Civitello | 84/274 |
| 4,135,426 | 1/1979 | Rickard | 84/1.16 |
| 4,149,443 | 4/1979 | Bringe | 84/318 |
| 4,171,661 | 10/1979 | Rose | 84/313 |
| 4,175,467 | 11/1979 | Lashley | 84/312 P |
| 4,201,108 | 5/1980 | Bunker | 84/1.16 |
| 4,248,127 | 2/1981 | Lieber | 84/314 N |
| 4,304,163 | 12/1981 | Siminoff | 84/314 N |
| 4,324,165 | 4/1982 | Wilkerson | 84/318 |
| 4,457,201 | 7/1984 | Storey | 84/313 |
| 4,475,432 | 10/1984 | Stroh | 84/314 N |
| 4,517,874 | 5/1985 | Fender | 84/314 N |
| 4,669,350 | 6/1987 | Gressett, Jr. et al. | 84/314 N |

FOREIGN PATENT DOCUMENTS

| | | | |
|---|---|---|---|
| 72716 | 7/1892 | Fed. Rep. of Germany | 84/299 |
| 60-176488 | 11/1985 | Japan . | |

OTHER PUBLICATIONS

Guitar Player, Nov. 1982, Rockinger Guitar Adv.

*Primary Examiner*—Lawrence R. Franklin
*Attorney, Agent, or Firm*—William E. Jackson

[57] ABSTRACT

A finger operated locking nut assembly for a stringed instrument is provided including a baseplate for separating and maintaining the strings over the fretboard, a locking block for pressing the strings against the baseplate and a cam action lock screw. The lock screw provides a first, unlocked position for allowing the strings to slide for tuning of the instrument and a second, locked position for maintaining the tune of the instrument during play. The preferred lock screw includes a threaded body to allow rough adjustment and a transverse head bifurcating a pivoting lever tab to define spaced cams. These cams provide spaced contact points across the block for even pressure and secure locking of the strings.

34 Claims, 2 Drawing Sheets

LOCKING NUT ASSEMBLY FOR A GUITAR

Matter enclosed in heavy brackets [ ] appears in the original patent but forms no part of this reissue specification; matter printed in italics indicates the additions made by reissue.

This is a continuation-in-part of application Ser. No. 544,122, filed Oct. 21, 1983, now abandoned.

TECHNICAL FIELD

The present invention relates generally to musical instruments, and, more particularly, to a string locking nut assembly for a guitar wherein simple finger operation between a first, unlocked position for allowing the instrument to be tuned and a second, locked position for maintaining the tune of the instrument during play is possible.

BACKGROUND ART

Tremolo or vibrato devices for special effects are well known to those skilled in the guitar art. In fact, various devices of this kind, having different structural configurations, are presently available in the market place. The devices allow the guitarist to provide a vibrato effect to alter the tone of the instrument by rapidly increasing or decreasing the string tension during play. This alteration in tension is brought about by back and forth movement of the tremolo device by a hand lever that is capable of transmitting a substantial stretching force to the strings. This force, particularly under the most demanding playing conditions, leads to slight slippage of the strings over the baseplate of the assembly, and the subsequent failure of the guitar to return to the original tune. Also, the detuning may result from simply a slight stretching of the strings beyond the elastic limit.

In the past, little attention has been paid to improving the nut assembly, either in terms of improving the holding ability or providing for quick release and readjustment. U.S. Pat. No. 4,171,661 to Rose discloses blocks held by single bolts or screws for clamping the strings of the guitar at the nut assembly. Specifically, the nut assembly includes a series of rigid blocks each clamping a pair of strings on a baseplate by means of a single screw. The blocks overlie the strings and hold them in proper position within the slots when the screws are tightened, the strings being released for returning of the instrument when the screws are all loosened.

The Rose nut assembly suffers from a serious drawback. In order to retune a guitar fitted with the Rose tremolo apparatus, it is necessary to use a separate wrench or screwdriver to loosen the blocks and allow adjustment of the string tension. This time consuming and tedious operation is particularly inconvenient during a live performance. Additionally, the needed tools may not be available on stage or during a recording session when an audience and/or a highly paid sound technician is left sitting and waiting. Indeed, some guitar manufacturers have recognized the problem but have attempted to solve it in a patchwork manner by attaching a tool holder to the backside of the pegboard of the guitar. While the tool is then usually more convenient, it is subject to be lost, or even fall out at the most inopportune times, and requires an inordinate amount of time to remove the tool, make the adjustment and return the tool to the holder.

Thus, a need is identified for a locking nut assembly that maintains the original tune of the guitar after tremolo play while also allowing simple and efficient returning without the need of additional tools. As yet, this need is unaddressed in the art.

DISCLOSURE OF THE INVENTION

Accordingly, it is a primary object of the present invention to provide an improved locking nut assembly overcoming the above-described limitations and disadvantages of the prior art.

Another object of the present invention is to provide an improved locking nut assembly that may be mounted and adjusted by hand without the need of a separate tool such as a wrench, screwdriver or the like.

Still another object of the present invention is to provide an improved locking nut assembly for maintaining the original tune of a guitar after tremolo play, even under the most demanding conditions, and also allowing returning by a simple finger adjustment.

Still another object of the present invention is to provide an improved locking nut assembly providing a firmer and more evenly distributed clamping pressure across the width of the block for more secure holding force.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects and in accordance with the purposes of the present invention as described herein, an improved locking nut assembly is provided for maintaining the original tune of the guitar following tremolo play and allowing easy, simple and efficient guitar returning without the need of additional tools for loosening the clamping pressure of the assembly on the strings. The locking nut assembly of the present invention includes a baseplate, a locking block and a cam action lock means, such as a screw and associated lever tab.

The baseplate is connected to the guitar adjacent the top of the fretboard. The baseplate separates the strings and maintains them at a proper playing height above the fretboard. The locking block overlies the strings on the baseplate. The cam action locking screw passes freely through the block and is threadedly received in the baseplate so as to maintain the block over the strings and in contact with the baseplate.

When the cam action lock screw is in a first, unlocked position, the pressure on the strings is such that the strings can slide relative to the baseplate, thereby allowing tuning of the instrument. When the cam action lock screw is in a second, locked position, positive clamping pressure is placed on the strings between the block and baseplate. Thus, the strings are firmly and positively clamped in place at the nut assembly so as to prevent the strings from slipping. Consequently, the original tune of the guitar is retained even after extended tremolo play.

More specifically, the baseplate includes a series of spaced slots, each slot receiving one string. Preferably, the slots are V-shaped so as to define an included angle of substantially 60%. The slots are the most convenient and efficient means for retaining the strings in spaced relation over the fretboard.

Each locking block and associated cam action lock screw retain at least a pair of strings at a constant tension over the baseplate. The cam action lock screw includes a pivot pin extending from the head of the screw perpendicular to the screw threads. A wedge-shaped lever tab operable by finger pressure pivots about this pin. The pivot point is off center with respect to the base portion of the lever tab so that the radius is substantially constantly increasing, thereby insuring the desired firm clamping pressure when the lever tab is flipped-down into the locked position. As a means for roughly adjusting the cam force, the screw may be tightened to increase the cam force or loosened to reduce the cam force before the lever is flipped down into the locked position. When the lever-tab is up in the unlocked position, this rough adjustment is easily accomplished by twisting the screw through simple finger pressure on the tab.

The base portion of the tab is bifurcated with the head of the screw thus positioned between two spaced cams. There is thus provided spaced contact points substantially spanning the top of the clamping blocks. This provides a firm and evenly distributed holding force by virtually eliminating any tendency of the blocks to flex adjacent the sides where the strings are positioned.

Still other objects of the present invention will become readily apparent to those skilled in this art in the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawings.

BEST MODE OF CARRYING OUT THE INVENTION

Figures 1, 6A, 6B:
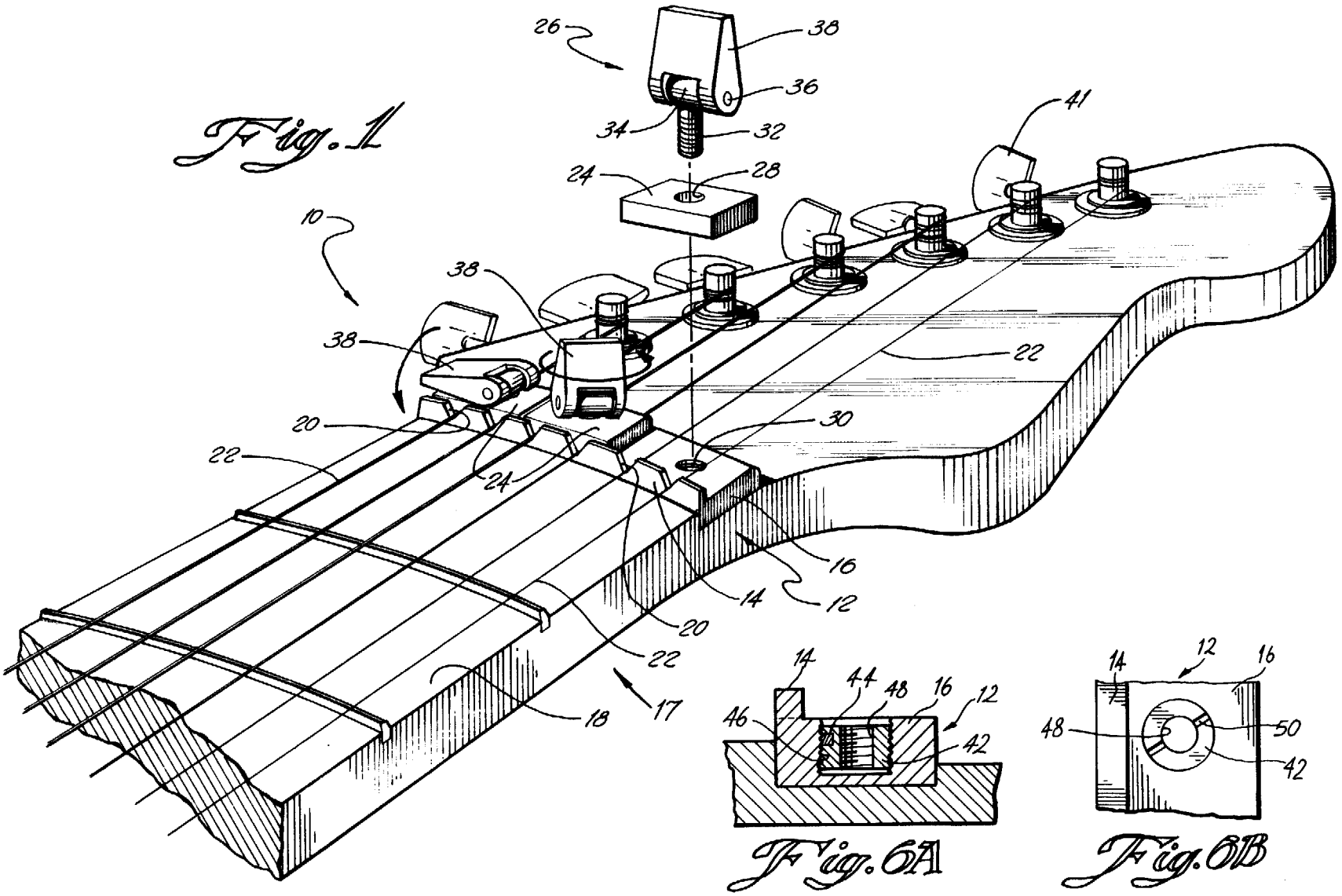
FIG. 1 is a partially exploded perspective view of the locking nut of the present invention showing the baseplate, locking block and cam action lock screw on a guitar in the removed, locked and unlocked positions.
FIGS. 6A and 6B are views of a threaded insert mounted in the baseplate to receive the lockscrew.
Figure 4:
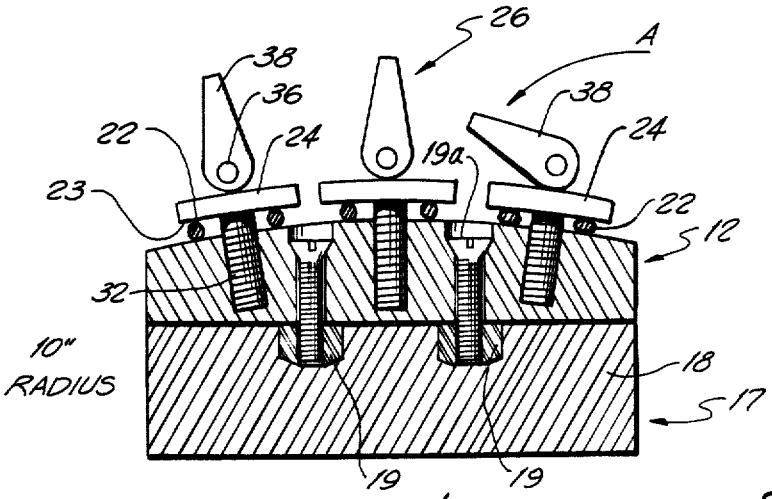
FIG. 4 is an enlarged cross-sectional view along the length of the baseplate (looking toward the peghead) showing a locking nut assembly of the present invention with multiple locking blocks and screws for clamping multiple pairs of strings.

Reference is now made to FIG. 1 showing the improved locking nut assembly 10 of the present invention for clamping the strings and retaining the original tune of a guitar, and especially adapted for use with a tremolo unit. The locking nut assembly 10 includes a baseplate 12 having an upstanding ridge portion 14 and an anchoring portion 16. The baseplate 12 is secured on the guitar neck 17 across the fretboard 18 by self-tapping threaded inserts 19 and machine screws 19a (FIG. 4).

The inserts 19 are screwed flush into predrilled holes in the neck 17. The machine screws 19a are then screwed down the middle of the inserts 19 to provide a much greater resistance to shearing and loading when the strings 22 are completely slacked. This method of anchoring the baseplate 12 to the neck 17 eliminates the need to drill completely through the neck and bolt from the bottom as in prior art designs wherein the structural integrity of the neck is adversely affected.

As shown in FIG. 1, upstanding ridge portion 14 of baseplate 12 includes a series of slots 20. Preferably, the slots 20 are V-shaped defining an included angle of 60° for receiving a single guitar string 22. Together, the slots 20 separate the strings 22 and maintain them at the proper playing height over the fretboard 18.

The locking nut assembly 10 also includes locking block 24. The locking block 24 overlies the strings 22 and the baseplate 12 so that the strings 22 are retained within the slots 20. As shown in FIG. 4, the locking block 24 includes a cambered bottom surface 23. The surface 23 is machined to fit snugly across the arced surface of the baseplate 12 which supports the strings 22. The camber of the block and arc of the baseplate is preferably about a 10 inch radius to match the curvature of the fretboard playing surface 18.

Preferably, each locking block 24 retains a pair of strings 22 so that a 6-string guitar is provided with three locking blocks. As shown in FIGS. 1, 3A, 3B and 4, the locking block 24 is secured to the baseplate 12 by means of a cam action lock screw, generally designated by reference numeral 26. The lock screw 26 freely passes through aperture 28 in locking block 24 and is threadedly received in aperture 30 in anchoring portion 16 of baseplate 12. It should be appreciated that the locking block 24 is shaped so as to fit adjacent upstanding ridge portion 14 and overlie anchoring portion 16 of baseplate 12.

The cam action lock screw 26 includes a screw body 32 and a transverse head portion 34 having a passage for receiving pivot pin 36. A lever tab 38 pivots about the pivot pin 36. The pivot point 39 of the lever tab 38 is off-set with respect to the constant radius of the base portion 40 of the tab (see FIG. 5), thereby providing a substantially constantly increasing camming radius.

Advantageously, the locking nut 10 of the present invention is quite simple to use. As shown in FIG. 1, the cam action lock screw 26 is fed through aperture 28 in locking block 24. The cam action lock screw 26 is then threaded into aperture 30 in baseplate 12 until snug, thereby securing the locking block 24 in position with the strings 22 between the locking block and the baseplate. It should be appreciated that the lever tab 38 of cam action lock screw 26 allows this operation to be performed by hand without the need of additional tools.

Figure 2:
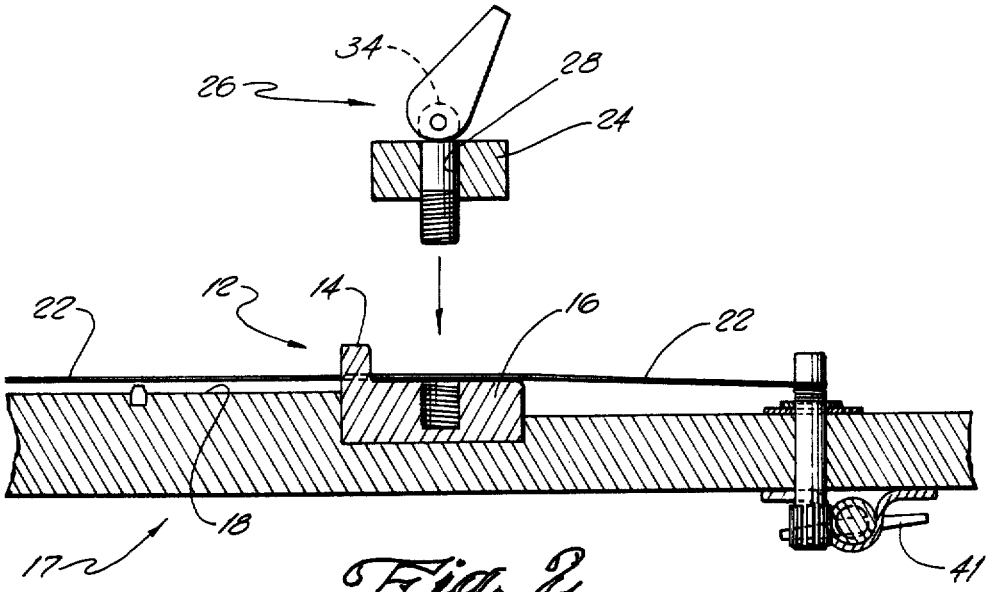
FIG. 2 is an enlarged cross-sectional view of the baseplate on the fretboard of the guitar and locking block and lock screw of the present invention together ready for mounting for use.
Figure 3A:
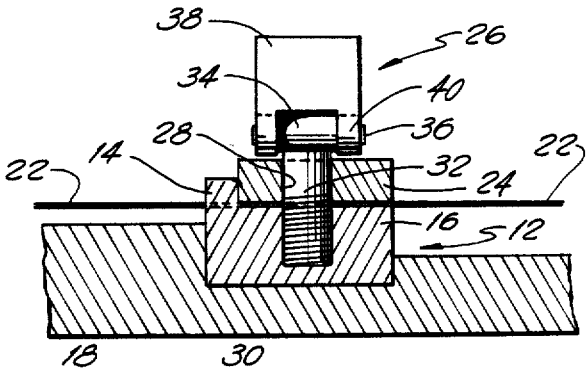
FIG. 3A is an enlarged cross-sectional view of the locking nut assembly of the present invention in the unlocked position.
Figure 3B:
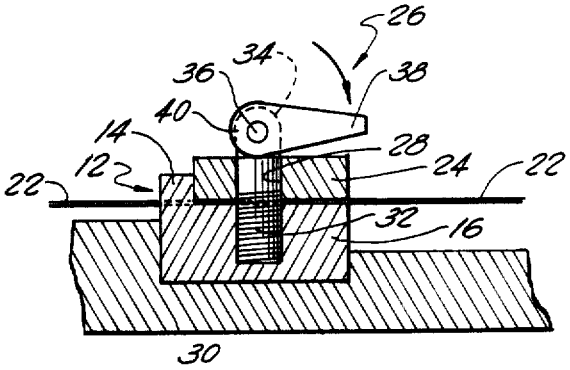
FIG. 3B is an enlarged cross-sectional view of the locking nut of the present invention in the locked position.

When the lever tab 38 is in the upright, unlocked position as shown in FIG. 3A, pressure of the strings 22 by the locking block 24 is released and the strings slide, thereby allowing longitudinal tuning movement of the strings 22 by pegs 41 (see FIG. 2). Then, when the lever tab 38 is flipped down into the locked position, as shown in FIG. 3B, the clamping pressure on the strings 22 between the locking block 24 and baseplate 12 is increased by cam action. Therefore, when the lever tab 38 is locked, the strings are firmly and positively held in place so as to prevent slipping or longitudinal movement. Consequently, the original tune of the guitar is retained even after extended tremolo play.

Further, when the lever tab 38 is in the upright, unlocked position, the screw 32 may be tightened by hand to roughly increase the cam force wheh the tab is once again locked. Conversely, loosening the screw 32 results in reduced clamping pressure on the strings 22 between the baseplate 12 and locking block 24 when the lever tab 38 is pushed down and locked. The rough adjustment provided assures a suitable range of proper functioning of the locking nut assembly 10 of the present invention regardless of the thickness of the strings 22. The fine adjustment, as will be seen more in detail below, is provided by depressing the lever 38 with more or less pressure when the final locking takes place.

Should returning of the guitar become necessary, the lever tab 38 may be finger actuated to the unlocked position shown in FIG. 3A. Again, in this position the clamping pressure on the strings 22 is released and longitudinal movement of the strings over the nut 10 is provided. Thus, it should be appreciated that the locking nut 10 of the present invention allows rapid and easy retuning of the guitar without the need of a wrench, screwdriver or other tool. Following retuning, the locking of lever tab 38 once again provides clamping pressure to the strings 22 sufficient to retain constant tension and maintain the new tune of the guitar.

As shown in FIGS. 6A and 6B, a threaded insert 42 may be provided for allowing initial adjustment of the angular orientation of each cam action lock screw 26. Specifically, the insert 42 threadably engages the base plate 12. A nylon plug 44 in the insert 42 bears against the threaded aperture 46 of the base plate 12 to positively retain the insert in position.

The screw body 32 of the cam action lock screw 26 engages the threaded aperture 48 of the insert 42 for rough adjustment relative to the locking block 24. Thus, it should be appreciated that by adjusting the position of the insert 42 within the base plate 12, the angular orientation of each cam action lock screw 26 at the completion of the snugging and rough adjustment may be varied. Particularly, the cam action lock screws 26 may each be aligned, for example, with each lever tab 38 extending in the direction shown in FIG. 3B. This advantageously allows easier lock screw actuation and more precise pressure adjustment while providing a more aesthetically pleasing appearance. Further, it should be appreciated that once the insert 42 is properly positioned as, for example, utilizing a screwdriver and engaging the machined grooves 50, readjustment is typically not required.

The clamping efficiency of the lock screw against the block 24 is maximized by its unique design. The transverse head 34 bifurcates the base portion 40 so as to form two spaced apart cams that are thus effective to contact the block substantially adjacent the edges. This is true regardless of whether the tab 38 is turned toward the side (see left head tab in FIG. 1), in the direction of the neck 17 or any position in between. As will be apparent, the clamping force is thus more evenly distributed, providing more effective locking of the strings 22 is position.

Also, since the spaced cam construction provides a substantially straight down clamping force, the block 24 does not tend to skew or rotate during tightening. In the past, as the single, centrally located screw, as shown in the Rose patent, is tightened to provided the clamping force, the block 24 tends to skew with respect to the baseplate 12 distorting the strings 22. This introduces false tightening action and potential slippage of the block during hard play on the guitar. The tension on the strings forces the block to rotate in the opposite direction having the deleterious effect of detuning the instrument.

In summary, numerous benefits have been described which result from employing the concepts of this invention. No wrenches, screwdrivers or other tools are needed in attaching and actuating the locking block 24 to the baseplate 12 of the present invention. The cam action lock screw 26 is operable by finger pressure to provide sufficient clamping force to the strings 22 between the locking block 24 and baseplate 12 to retain the desired tune of the instrument. Easy adjustment of the clamping pressure on the strings 22 at the nut 10 is provided by tightening or loosening the cam action screw 26 for rough adjustment and depressing the lever tab with the desired pressure for the fine adjustment, regulated by the sensitive feel of the musician. The finger actuation of the lever tab 38 to the unlocked position allows quick release for retuning of the instrument by the pegs 41 without the need of additional tools.

Figure 5:
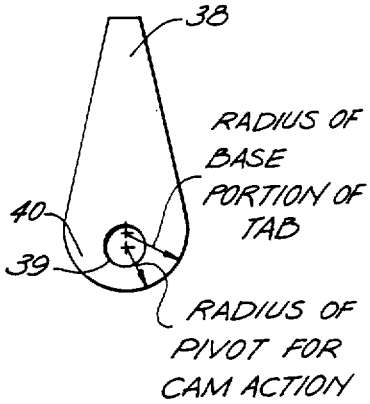
FIG. 5 is an enlarged elevational view of the lever tab of the present invention showing the off-center base portion to allow cam action.

*As used herein, "string nut means" refers to the upstanding ridge portion 14 of the baseplate 12 as shown in FIG. 1. Also, "support means" and "string support surface", respectively, refer to the anchoring portion 16 of baseplate 12 and the surface portion of anchoring portion 16 which is adjacent to string 22, as shown in FIGS. 1–4. "Hand tightenable means" to effect force on string 22 between a locking block and a string support surface refers to a threaded aperture 30 in anchoring portion 16 and a lock screw 26, having screw body 32, transverse head portion 34, pivot pin 36 and lever tab 38. "Hand operable means" to effect a holding force on the string portion between the locking block and string support surface includes a lever tab 38 having a pivot point 39 and base portion 40 (FIG. 5), and pivot pin 36 mounted on portion 34 of screw body 32. As shown in FIGS. 3B, 4 and 5, as lever 38 is moved from a release to a locked position in the direction of arrow A, the increasing cam radius of base portion 40 provides an increasing holding force against clamping block 24 by increasing the force between the clamping block 24 and the pivot pin 36 of transverse head portion 34.*

*The term "mechanical advantage" as used herein refers to the ratio of the force exerted by a mechanism (the output) to the force exerted on the mechanism by an operator (the output). See McGraw-Hill Encyclopedia of Science and Technology, 1960, vol. 8, p. 189.*

The foregoing description of the preferred embodiment of the invention has been presented for purposes of illustration and description. It is not intended to be exhaustive or to limit the invention to the precise form disclosed. Obvious modifications or variations are possible in light of the above teachings. For example, the baseplate 12 and locking block 24 could be a different shape and having different contours, in accordance with the broad aspects of the invention. The body 32 of the screw 26 could be replaced with other fastening means, such as a T-shaped head to fit in a slot and held against removal after a 90° rotation if the rough adjustment of the preferred embodiment is not desired. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A locking nut assembly for retaining the strings of a guitar or the like at a constant tension over the fretboard and operable by finger pressure, comprising:

a baseplate located adjacent the top of the fretboard, said baseplate providing a base for said strings for tensioning;

a plurality of locking blocks overlying said baseplate; and cam action lock means for providing pressure to said locking blocks against said strings, said lock means including a cam lever having a first, unlocked position to allow the tuning of the instrument and a second, locked position to [proivde] *provide* the clamping pressure to said locking blocks, whereby to allow the strings to be retained at a constant tension and in tune during play and quickly released for retuning.

2. The locking nut assembly disclosed in claim 1, wherein said baseplate includes a plurality of slots for receiving the strings.

3. The locking nut assembly disclosed in claim 2, wherein said slots are each V-shaped defining an included angle of substantially sixty degrees.

4. The locking nut assembly disclosed in claim 1, wherein each locking block retains at least a pair of strings at a constant tension.

5. The lock nut disclosed in claim 1, wherein threaded inserts are provided that may be adjustably positioned within said base plate, said threaded inserts receiving said cam action lock means and allowing adjustment of the angular orientation of said cam action lock means for easier actuation.

6. The locking nut disclosed in claim 5, wherein said threaded inserts each include a means for locking said insert in position within said base plate.

7. The locking nut disclosed in claim 6, wherein said insert locking means includes a nylon plug that bears against said base plate.

8. The locking nut disclosed in claim 1, wherein said baseplate is mounted to the guitar by means of self-tapping threaded inserts and machine screws.

9. A locking nut assembly for retaining a string of a guitar or the like at a constant tension over the fretboard and operable by finger pressure, comprising:

a baseplate located adjacent the top of the fretboard, said baseplate providing a base for said string for tensioning;

a locking block overlying said string and said baseplate; and cam action lock means for providing pressure to said locking block against said basplate, said lock means including a rotatable shaft passing freely through said block and lockingly engaging said baseplate and a cam lever pivotally mounted on the end of said shaft, said cam lever having a first, unlocked position to allow the tuning of the instrument and a second, locked position to provide the clamping pressure between said locking block and baseplate, whereby to allow the string to be retained at a constant tension and in tune during play and quickly released for retuning.

10. The locking nut assembly disclosed in claim 9, wherein the rotatable shaft is a screw and threadedly engages said base plate to allow a rough adjustment of the locking pressure.

11. The locking nut disclosed in claim 9, wherein the head of said screw includes a pivot pin transverse to the screw threads and said cam lever defines spaced cams for evenly distributing the cam force across said block.

12. The locking nut disclosed in claim 11, wherein said cam lever includes a wedge-shaped tab operable by finger pressure, said lever tab pivoting about said pivot pin off center with respect to a radius defined by said cams, said radius being substantially constantly increasing during actuation of said lever.

*13. In a musical instrument having a fretboard, string, a tuning peg, and string nut means mounted on said instrument at a location between the end of said fretboard and said tuning peg, said string nut means being engaged by said string the improvement comprising:*

*a string locking assembly for retaining said string at a constant tension over said fretboard and operatable by finger pressure, said assembly comprising:*

*(a) support means mounted on said instrument at a location between said string nut means and said tuning peg, said support means defining a string support surface for engagement by a portion of said string;*

*(b) a locking block relatively movable with respect to said string support surface for clamping said string portion against said string support surface;*

*(c) hand-tightenable means to effect force on said string portion between said locking block and said string support surface, said hand-tightenable means by itself, when hand tightened, not achieving force sufficient to clamp said string portion adequately to accure prevention of longitudinal movements thereof; and*

*(d) hand-operable means, including a lever and a cam means, to effect a holding force on said string portion between said locking block and said string support surface, said hand operable means being hand operable from a release position to a locked position, said hand operable means having a mechanical advantage large in comparison to that of said hand tightenable means so that operation thereof to said locked position achieves force sufficient to clamp said string portion adequately and assure prevention of longitudinal movements thereof.*

*14. The invention of claim 13 wherein said string nut means and said support means include a common baseplate.*

*15. The invention of claim 13 wherein said hand-tightenable means includes a hand-turnable threaded fastener means with a hand-turnable transverse head portion.*

*16. The invention of claim 13 wherein said hand-operable means includes a shaft passing through said locking*

*block and said cam means and lever are pivotally mounted on the end of said shaft.*

*17. The invention of claim 13, wherein said hand-operable means to effect a holding force on said string portion includes a cam element movable for relatively displacing said locking block and said string support surface for clamping said string portion, said cam element being movable by said lever.*

*18. The invention of claim 17 wherein said movable cam element is a contoured cam having a contour which increases from a small size to a relatively large size.*

*19. The invention of claim 18 wherein said hand-tightenable means (c) includes a hand-turnable threaded fastener means with a hand-turnable transverse head portion, said contoured cam engages said head portion, and increasingly larger portions of said contoured cam are moved between said head portion and said locking block as said hand-operable means (d) is moved from said release position to said locked position.*

*20. In a musical instrument having a fretboard, string, a tuning peg, and a string nut mounted on said instrument at a location between the end of said fretboard and said tuning peg, said string nut being engaged by said string, the improvement comprising:*

*a string locking assembly for retaining said string at a constant tension over said fretboard and operable by finger pressure, said assembly comprising:*

*(a) support means mounted on said instrument at a location between said string nut and said tuning peg, said support defining a string support surface for engagement by a portion of said string;*

*(b) a locking block relatively movable with respect to said string support surface for clamping said string portion against said string support surface;*

*(c) hand-tightenable mechanism, including a hand-turnable threaded body, to effect force on said string portion between said locking block and said string support surface, said hand-tightenable mechanism by itself, when hand tightened, not achieving force sufficient to clamp said string portion adequately to assure prevention of longitudinal movements thereof; and*

*(d) hand-operable mechanism, including a lever and a cam element, to effect a holding force on said string portion between said locking block and said string support surface, said hand-operable mechanism being hand operable from a release position to a locked position, said hand-operable mechanism having a mechanical advantage large in comparison to that of said hand-tightenable mechanism so that operation thereof to said locked position achieves force sufficient to clamp said string portion adequately and assure prevention of longitudinal movements thereof.*

*21. The invention of Claim 20 wherein said string nut and said support have a common baseplate.*

*22. The invention of claim 20 wherein said hand-tightenable mechanism includes a hand-turnable threaded body with a hand-turnable transverse head portion.*

*23. The invention of claim 20 wherein said hand-operable mechanism includes a shaft passing through said locking block and said cam element and lever are pivotally mounted on the end of said shaft.*

*24. The invention of claim 20 wherein said hand-operable mechanism to effect a holding force on said string portion includes a cam element movable for relatively displacing said locking block and said string support surface for clamping said string portion, said cam element being movable by said lever.*

*25. The invention of claim 24 wherein said movable cam element is a contoured cam having a contour which increases from a small size to a relatively large size.*

*26. The invention of claim 25 wherein said hand-tightenable mechanism (c) includes a hand-turnable threaded body with a hand-turnable transverse head portion, said contoured cam engages said head portion, and increasingly larger portions of said contoured cam are moved between said head portion and said locking block as said hand-operable mechanism (d) is moved from said release position to said locked position.*

*27. In a musical instrument having a fretboard, strings, tuning pegs, and string nut means mounted on said instrument at a location between the end of said fretboard and said tuning pegs, said string nut means being engaged by said strings, the improvement comprising:*

*a string locking assembly for retaining said strings at a constant tension over said fretboard and operable by finger pressure, said assembly comprising:*

*(a) support means mounted on said instrument at a location between said string nut means and said tuning pegs, said support means defining a string support surface for engagement by a portion of each of said strings;*

*(b) locking blocks relatively movable with respect to said string support surface for clamping said string portions against said string surface; and*

(c) cam action lock means operable by finger pressure to effect holding forces on said strings between said locking blocks and said string support surface, said cam action lock means including a movable lever and a cam means, said lever having a first, unlocked position to allow tuning of a string, and a second, locked position wherein said cam surface effects clamping pressure on a locking block, whereby to allow said string portions to be retained during play of said instrument and quickly released for retuning.

*28. The invention of claim 27, wherein each of said cam action lock means includes a cam element movable for relatively displacing said locking block and said string support surface for clamping said string portion, said cam element being movable by said lever.*

*29. The invention of claim 28, wherein said movable cam element is a contoured cam having a contour which increases from a small size to a relatively large size.*

*30. The invention of claim 29, wherein each of said cam action lock means includes a shaft with a transverse portion, said contoured cam engages said transverse portion, and increasingly larger portions of said contoured cam are moved between said transverse portion and said locking block as said lever is moved from said unlocked to said locked position.*

*31. In a musical instrument having a fretboard, strings, tuning pegs, and a string nut mounted on said instrument at a location between the end of said fretboard and said tuning pegs, said string nut being engaged by said strings, the improvement comprising:*

*a string locking assembly for retaining said strings at a constant tension over said fretboard and operatable by finger pressure, said assembly comprising:*

*(a) a support mounted on said instrument at a location between said string nut and said tuning pegs, said support defining a string support surface for engagement by a portion of each of said strings;*

*(b) locking blocks relatively movable with respect to said string support surface for clamping said string portions against said string surface; and*

*(c) cam action lock means operable by finger pressure to effect holding forces on said strings between said locking blocks and support surface, said cam action lock mechanisms each including a movable lever and a cam element, said lever having a first, unlocked position to allow tuning of a string, and a second, locked position wherein said cam surface effects clamping pressure on a locking block, whereby to allow said string portions to be retained during play of said instrument and quickly released for retuning.*

*32. The invention of claim 31, wherein each of said cam action lock mechanisms includes a cam element movable for relatively displacing said locking block and said string support surface for clamping said string portion, said cam element being movable by said lever.*

*33. The invention of claim 32, wherein said movable cam element is a contoured cam having a contour which increases from a small size to a relatively larger size.*

*34. The invention of claim 33, wherein each of said cam action lock mechanism includes a shaft with a transverse portion, said contoured cam engages said transverse portion, and increasingly larger portions of said contoured cam are moved between said transverse portion and said locking block, as said lever is moved from said unlocked to said locked position.*

* * * * *